(12) United States Patent
Rountree et al.

(10) Patent No.: US 10,948,348 B2
(45) Date of Patent: Mar. 16, 2021

(54) ADVANCED LIGHTING EFFECTS INVESTIGATION SYSTEM AND COMPUTERIZED METHOD

(71) Applicant: Research Triangle Institute, Research Triangle Park, NC (US)

(72) Inventors: Kelley Jo Rountree, Raleigh, NC (US); James Lynn Davis, Holly Springs, NC (US); Karmann Cressman Mills, Apex, NC (US); Georgiy Bobashev, Raleigh, NC (US); Robert Furberg, Research Triangle Park, NC (US); Anthony Clint Clayton, Rougemont, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 0 days.

(21) Appl. No.: 16/557,399

(22) Filed: Aug. 30, 2019

(65) Prior Publication Data

US 2020/0072669 A1 Mar. 5, 2020

Related U.S. Application Data

(60) Provisional application No. 62/725,053, filed on Aug. 30, 2018.

(51) Int. Cl.
*G01J 3/28* (2006.01)
*G01J 3/02* (2006.01)
*G01J 3/46* (2006.01)

(52) U.S. Cl.
CPC .......... *G01J 3/2803* (2013.01); *G01J 3/0218* (2013.01); *G01J 3/2823* (2013.01); *G01J 3/465* (2013.01); *G01J 2003/2873* (2013.01); *G01J 2003/2879* (2013.01)

(58) Field of Classification Search
CPC ...... G01J 3/2803; G01J 3/0218; G01J 3/2823; G01J 3/465; G01J 2003/2873; G01J 2003/2879
See application file for complete search history.

(56) References Cited

U.S. PATENT DOCUMENTS

| 5,061,997 A | 10/1991 | Rea et al. |
| 7,258,438 B2 | 8/2007 | Van Derlofske et al. |
| 8,508,138 B2 | 8/2013 | Chen et al. |

(Continued)

OTHER PUBLICATIONS

Wang, Q., Zhang, X. & Boyer, K.L. "Occupancy distribution estimation for smart light delivery with perturbation-modulated light sensing." J Sol State Light 1, 17 (2014), SpringerOpen, United States.

(Continued)

*Primary Examiner* — Jamil Ahmed
(74) *Attorney, Agent, or Firm* — Olive Law Group, PLLC; Ronald A. Rudder

(57) ABSTRACT

A mannikin-based optical analyzer for analyzing an exposure of a subject to an environmental lighting condition. The analyzer has a mannikin with an outer surface replicating a facial profile of the subject, an interior inside the outer surface, and at least one pupil for admission of light into the interior of the mannikin. The analyzer has at least one optical detector configured to acquire and wavelength analyze light directed through the at least one pupil.

23 Claims, 13 Drawing Sheets

(56) References Cited

U.S. PATENT DOCUMENTS

| | | | |
|---|---|---|---|
| 8,562,132 B2 | 10/2013 | Saito et al. | |
| 9,271,641 B1 | 3/2016 | Sims et al. | |
| 2004/0252275 A1* | 12/2004 | Van Derlofske | ......... A61B 3/06 |
| | | | 351/200 |
| 2012/0296400 A1 | 11/2012 | Bierman et al. | |

OTHER PUBLICATIONS

Rea, M., & Figueiro, M. "Light as a circadian stimulus for architectural lighting." Lighting Research & Technology, 50 (4), 497-51 (2018), The Chartered Institution of Building Services Engineers (CIBSE), United Kingdom.

Lucas, R. et al. "Measuring and using light in the melanopsin age." Trends in Neurosciences, vol. 37, No. 1, 1-9 (2014), Elsevier Ltd. Published by Elsevier Inc., United States.

Figueiro, M., Hamner, R., Bierman, A., & Rea, M. "Comparisons of three practical field devices used to measure personal light exposures and activity levels." Lighting Research & Technology, 45(4), 421-434 (2013), The Chartered Institution of Building Services Engineers (CIBSE), United Kingdom.

Smallwood, P. (Feb. 2018). "Global LED and Lighting Market Overview." Slides from Strategies in Light: the LED Show, Long Beach, California.

Edwards, L., and Torcellini, P. "A Literature Review of the Effects of Natural Light on Building Occupants." NREL/TP-550-30769 (Jul. 2002), National Renewable Energy Laboratory, Golden, Colorado.

\* cited by examiner

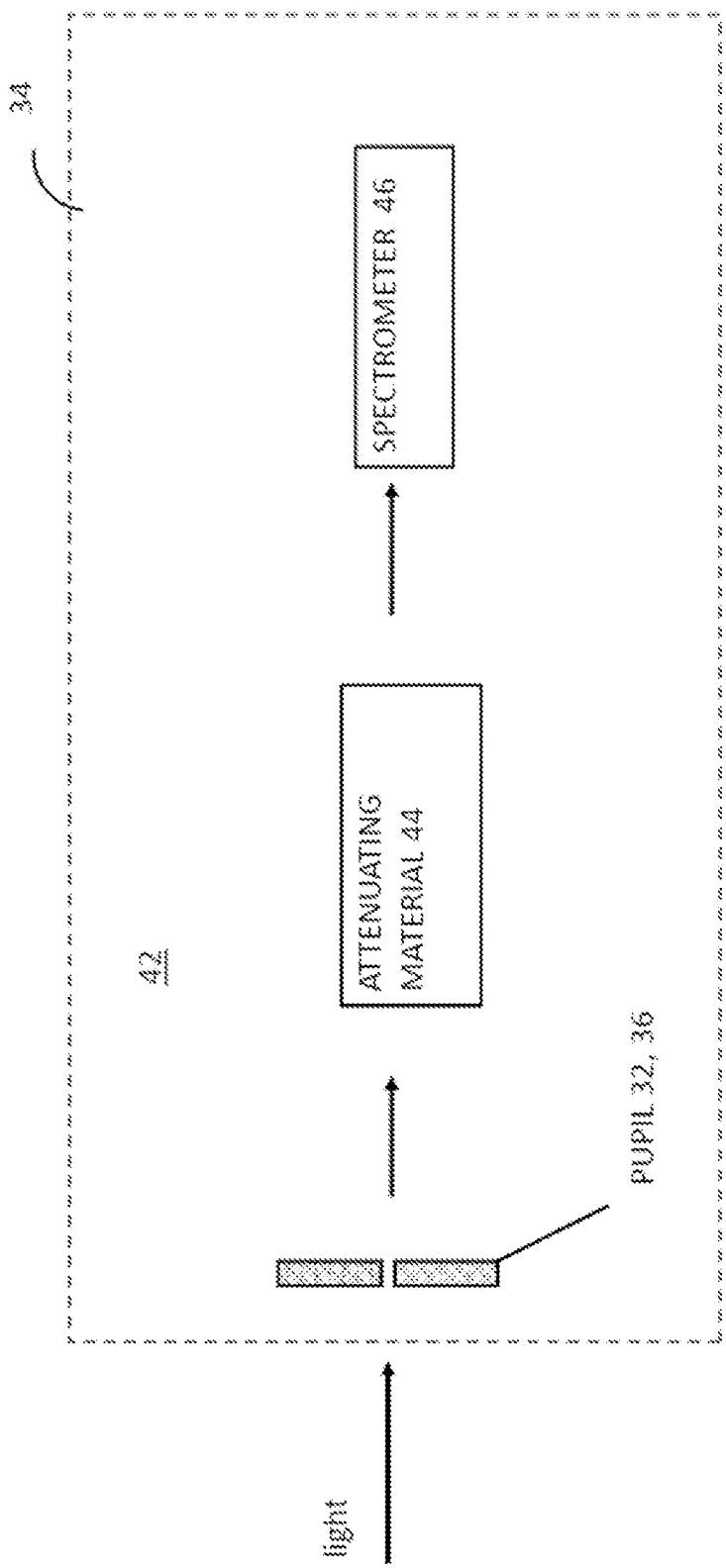

Figure 4B
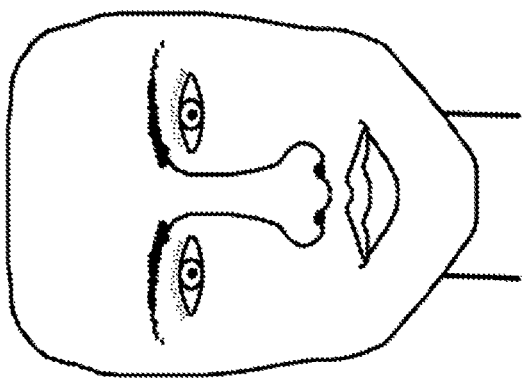

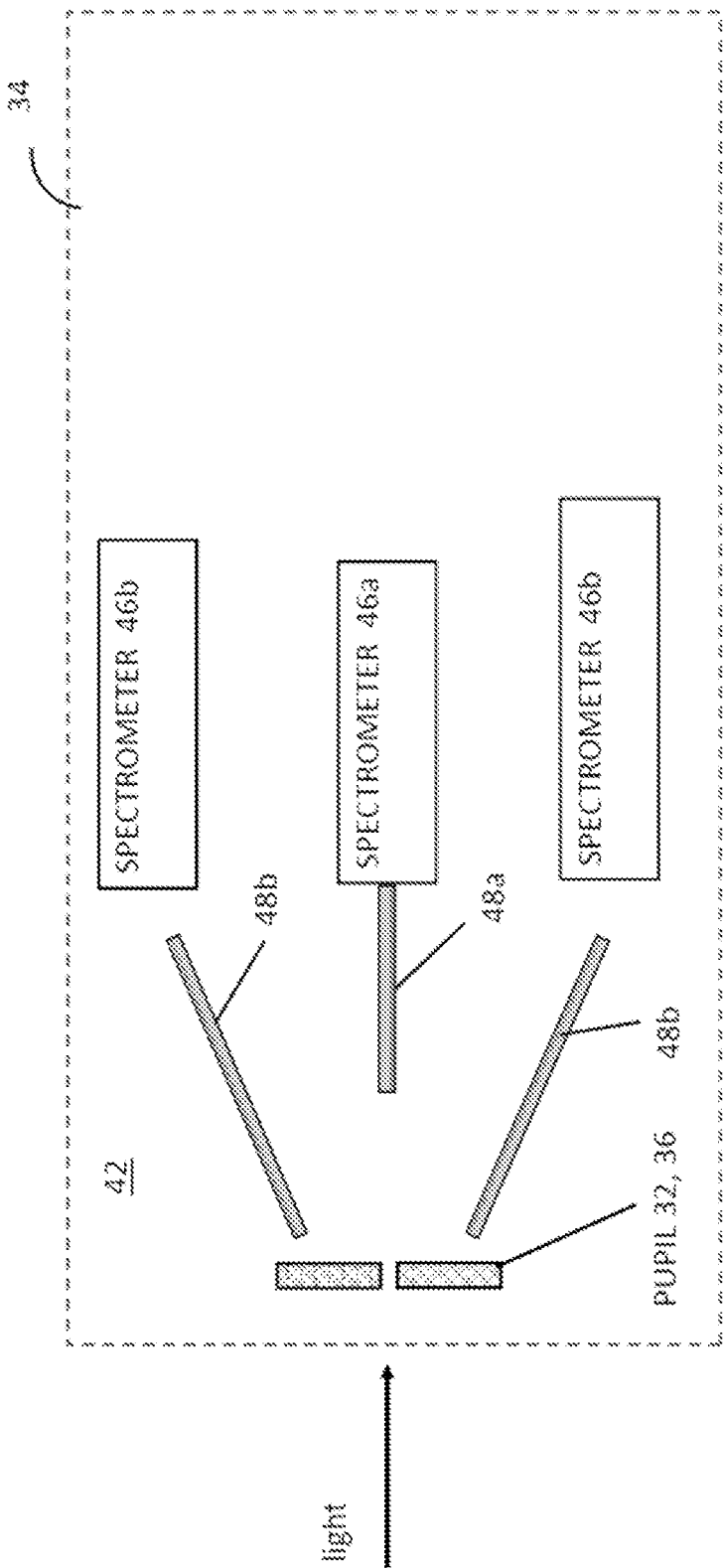

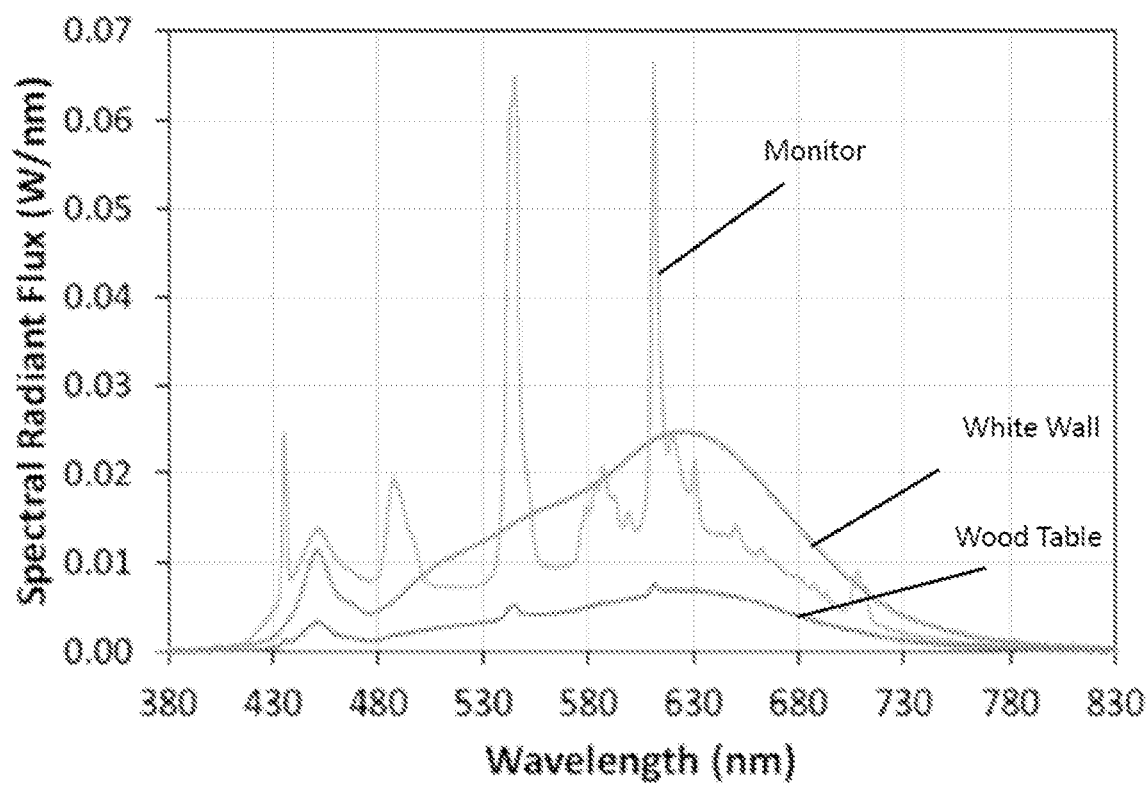

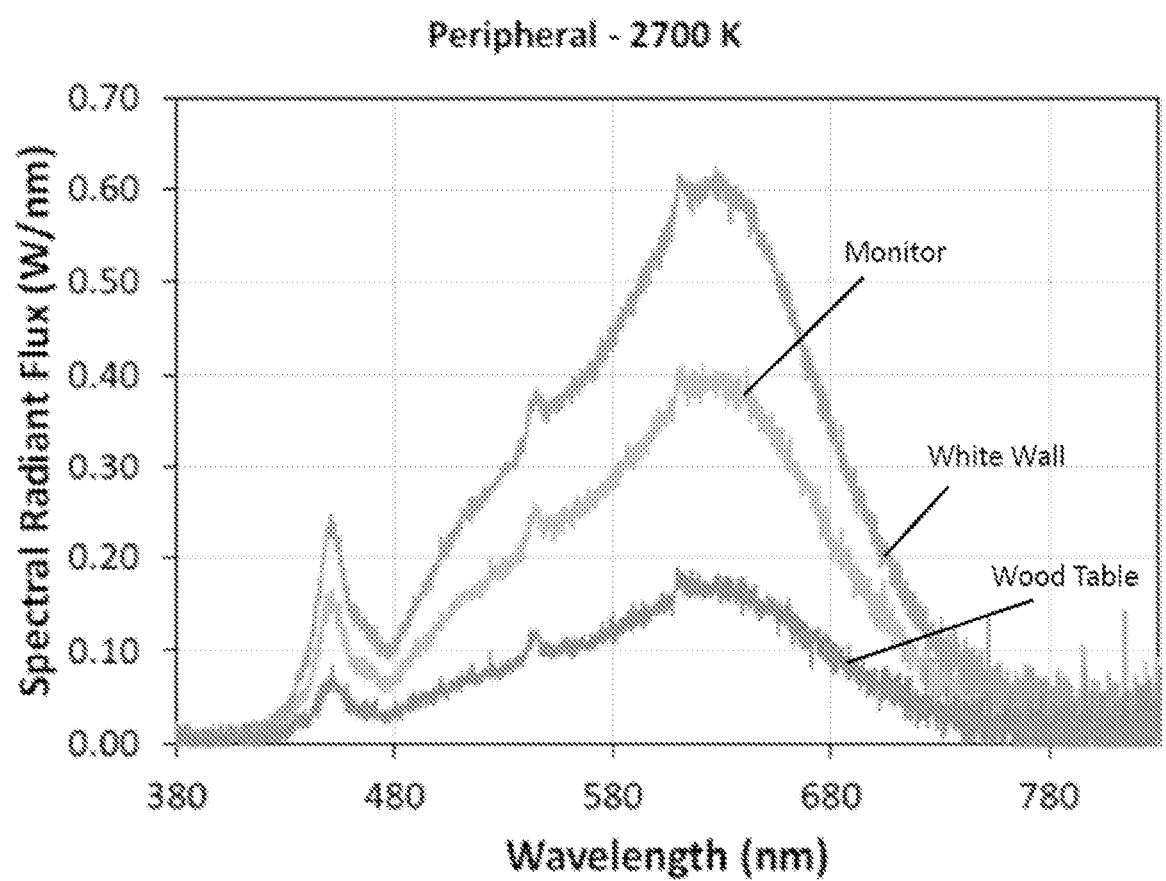

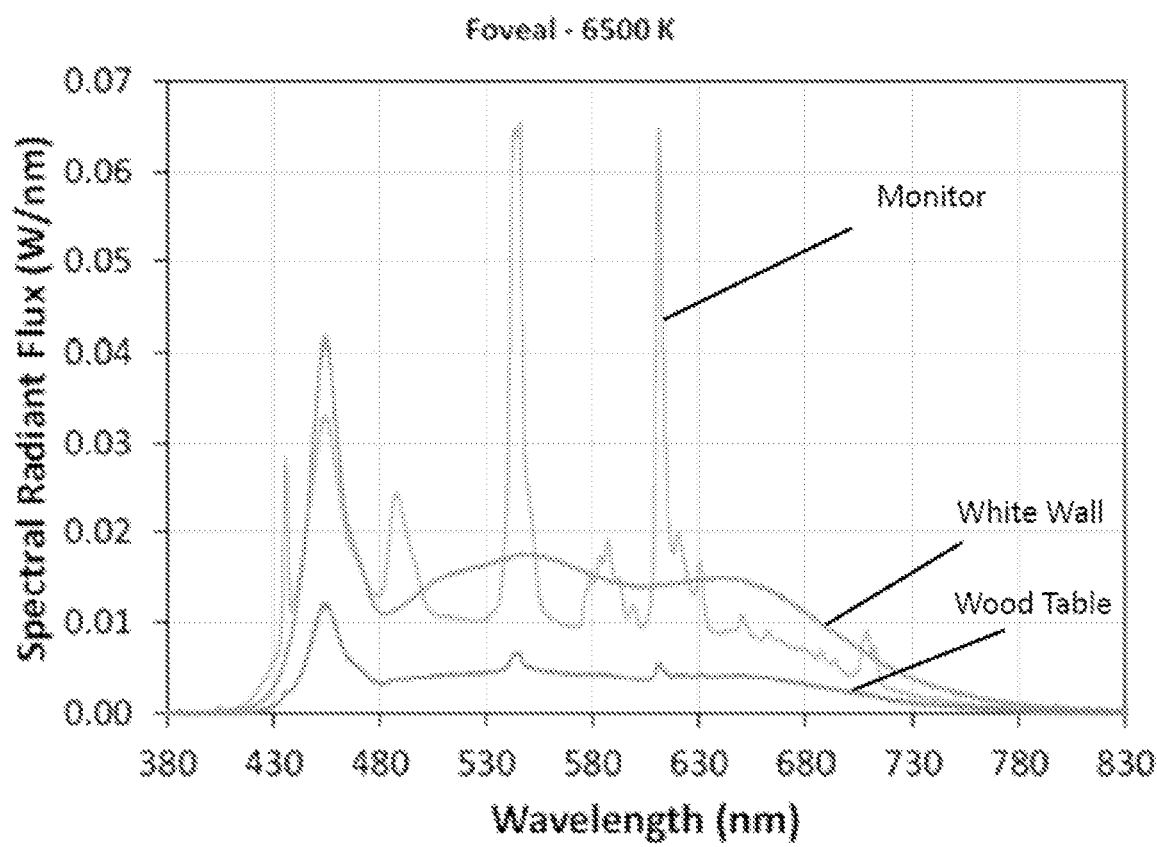

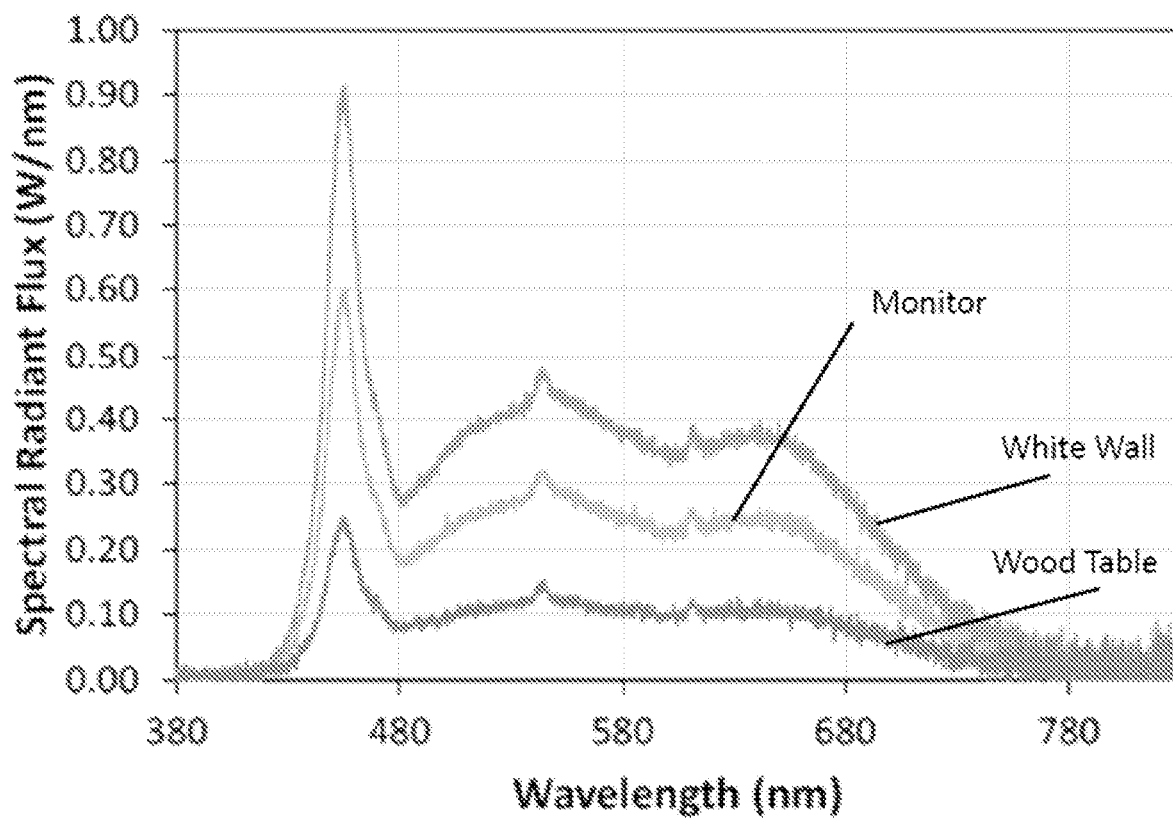

Figure 7

| Parameter | Higher DQI Score | Lower DQI Score |
|---|---|---|
| Lighting level measurement technique | Radiometry with calibrated spectrometer | Photometry |
| Lighting data provided | Full SPD (in <5 nm increments) and light levels reported | Only single parameter (e.g., CCT, circadian stimulus) are reported |
| Lighting measurement | At the eye | Room background |
| Test environment | Real-world conditions in an actual field site (e.g., office, residence, school) | Laboratory setting |
| Lighting spectrum variability | Tunable spectrum or tunable white | Fixed spectrum |
| Cohort characteristics | Cohort characteristics are well-defined with average age and statistics given; exclusion requirements are listed. | Cohort characteristics are not clearly described. |
| Physiological measurement methods | Actigraphy, electrodermal response, HR, HRV, electrocardiography (ECG), electroencephalography (EEG), and human fluids (e.g., saliva, blood) | Observation only |
| Cohort size | Large (e.g., 100+) | Small (≤20) |
| Testing duration | Long (≥24 hours) | Short (hours) |

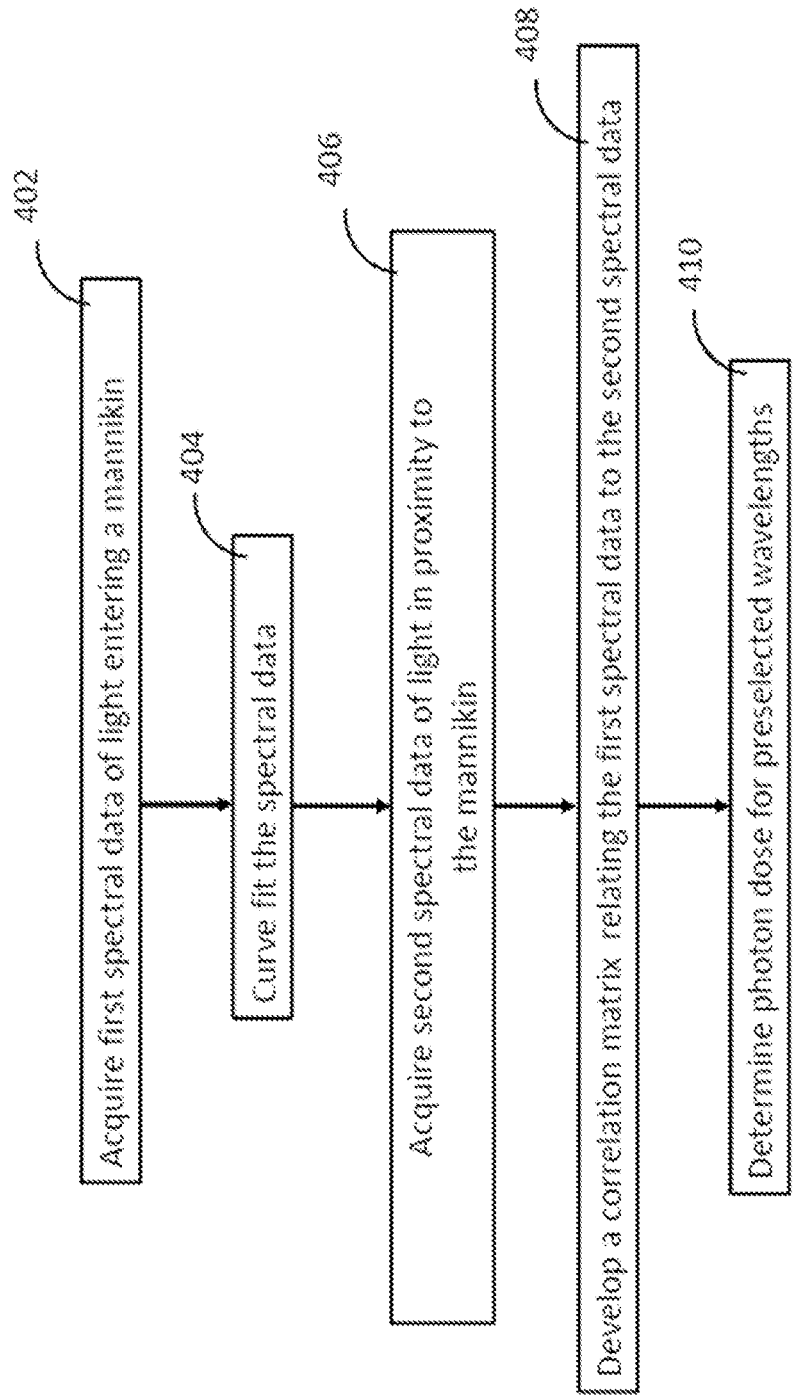

ADVANCED LIGHTING EFFECTS INVESTIGATION SYSTEM AND COMPUTERIZED METHOD

CROSS REFERENCE TO RELATED APPLICATIONS

This application is related to and claims priority to U.S. Ser. No. 62/725,053, filed Aug. 30, 2018, the entire contents of which are incorporated herein by reference.

BACKGROUND OF THE INVENTION

Field of Invention

The invention relates to optical apparatuses and techniques for the study of environmental light on a subject.

Discussion of the Background

As background, absorption of sunlight initiates many biological processes. These biological processes can include photosynthesis (in plants), vision (in animals), and circadian processes (in animals). For humans, both visual and non-visual responses to light are initiated in the retina, with visual responses occurring primarily through the cones and to a lesser extent the rod located in the fovea and non-visual responses being initiated at least partly in the intrinsically photosensitive retinal ganglion cells (ipRGCs) located in other parts of the retina. The retina circuitry in humans includes the photoreceptors (i.e., cones, rod, and ipRGCs) and an interconnect retinal circuitry that involves the Cone Bipolar cells (CBC), Rod Bipolar cells (RBC), and Amacrine cells (AII). The firing patterns of photoreceptors (e.g., the ipRGCs) can be influenced by both the intrinsic photoreceptor processes and extrinsic signals from other photoreceptors (e.g., cones and rods) through the interconnect retinal circuitry.

In total, there are five broad classes of photopigments in the human eye—three types of cones (blue, green, and red), the rods, and the ipRGCs. The cones, which are responsible for the perception of color, contain one of three types of photopigments (i.e., opsins)—cyanolabe (blue opsin), chlorolabe (green opsin), and erythrolabe (red opsin). In contrast, the rods contain a single photopigment (rhodopsin) and provide excellent light detection at low luminance or fluence levels, but with no color differentiation. The ipRGCs are involved in non-visual responses to light and contain a single photopigment (melanopsin) that is slower to respond to light, but can signal the presence of light over a long time period, than either cone or rod opsins.

Information about the light received by the retina is processed by the different photopigments in the retina and transmitted to the optic nerve through the process of phototransduction. The signals from the cones and rods are primarily associated with the visual response and are directed to the visual cortex in the occipital lobe in the back of the brain. In contrast, the signals from the ipRGCs are sent through the retinohypothalamic tract (RHT) directly to the suprachiasmatic nucleus (SCN) in the hypothalamus (which is part of the limbic system in the brain). The limbic system is involved in a variety of human functions including emotion, behavior, learning and memory. The limbic system also influences the endocrine system (responsible for hormone production) and the autonomous nervous system (responsible for regulation of automatic body functions such as heart rate, respiration, and pupillary response).

In general, the effects of light on the human body are diverse. Besides directly impacting vision, light falling on the retina and being transmitted to the hypothalamus controls one's circadian rhythms, which are responsible for synchronizing one's internal clock to 24 hours (see Light, Sight, and Photobiology 1998). The effects of light on circadian rhythms have been studied using physiological variables such as the daily patterns of core body temperature, levels of melatonin, cortex activity, and alertness. In 1980, researchers noted that prolonged exposure to cool white fluorescent lights might induce abnormal circadian rhythms because the hypothalamic pacemaking mechanism is thought to react to all the color frequencies.

Other lighting studies by Salares and Russell in 1996 have shown that the light absorbed by the eye controls the production of the hormone melatonin, which affects sleep, mood, body temperature, puberty onset, and tumor development. For example, among the hormone activities that closely follow 24-hour cycles, the secretion of melatonin from the pineal gland (which induces sleep, modifies mood and mental agility, and plays a role in the activities of the reproduction system) is the most notable. Secretion of melatonin is closely followed by cortisol secretion from the adrenal cortex (which affects the breaking down of carbohydrates, protein and fat; the development of white blood cells; the activity of the nervous system; and the regulation of blood pressure.

Yet, even today, there exists a significant amount of uncertainty about the health impacts of lighting, especially exposure to light sources such the blue light emitted from light emitting diode sources and street lights. Additionally, there are documented cases of manufacturers exaggerating the potential health benefits of their lighting products. These occurrences not only create confusion in the market place, but also damage the credibility of solid state lighting (SSL) technologies prompting a possible slowdown (and even reversal) of the market penetration gains over the past decade.

Nevertheless, Lucas et al. in "Measuring and using light in the melanopsin age," Trends in Neurosciences, January 2014, vol. 37, no. 1, pp. 1-9 (the entire contents of which are incorporated herein by reference) have found that light is a potent stimulus for regulating human circadian, hormonal, and behavioral systems. These workers found that light therapy is effective for certain affective disorders, sleep problems, and circadian rhythm disruption. These biological and behavioral effects of light are influenced by a distinct photoreceptor in the eye, melanopsin-containing intrinsically photosensitive retinal ganglion cells (ipRGCs), in addition to conventional rods and cones. Given the broad range of physiological and behavioral effects, these workers analogized that, "in many ways, light can be considered a drug, having the potential for both beneficial and deleterious effects."

Presently, the only valid method to gathering information on the health care ramifications is through the use of costly and time-consuming human trials. Moreover, translating detailed laboratory studies to realistic lighting setting has proven to be difficult due to the different experiences of individuals in field installation (e.g., light exposure history of a test subject is often unknown and uncontrolled outside the lab) and the differences in end user response (e.g., applicability of results from children to senior citizens).

Prior devices, such as the ones described in U.S. Pat. No. 7,258,438, the entire contents of which are incorporated herein by reference, used artificial baffles to restrict the viewing cut-off on a retinal light meter. These baffles did not accurately reproduce the light experienced by humans during actual lighting conditions and/or under actual movements of the human head.

Thus, it is important in the study of the effects of light on the eye and body to be able to know precisely the wavelength and quantity of light and what regions of the eye the light is impacting in order to be able to correlate a lighting condition to the impact that it may have on a specific cohort exposed to the light.

SUMMARY OF THE INVENTION

In one embodiment, there is provided a mannikin-based optical analyzer for analyzing an exposure of a subject to an environmental lighting condition. The analyzer has a mannikin with an outer surface replicating a facial profile of a subject, an interior inside the outer surface, and at least one pupil for admission of light into the interior of the mannikin. The analyzer has at least one optical detector configured to acquire and wavelength analyze light directed through the at least one pupil.

In one embodiment, there is provided a lighting effect analysis system having the mannikin-based optical analyzer described above, and a population emulator for a) storage of data collected from the mannikin-based optical analyzer and b) correlation of the data collected to ambient light conditions for respective subjects.

In one embodiment, there is provided an ambient light sensor having an optical detector collecting ambient light and configured to wavelength analyze the ambient light into an ambient-light spectrum. The light sensor has a processor storing pre-recorded foveal-light spectra and retinal-light spectra from a plurality of subjects under different environmental lighting conditions, and the processor is programmed to select one of the pre-recorded foveal-light spectra and retinal-light spectra based on a) an identification of a specific lighting condition, b) a specific subject, and c) the ambient spectrum.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 4A is a schematic depicting one embodiment of the mannikin detector;

FIG. 4B is a depiction of front and side views of an actual mannikin for the mannikin detector of FIG. 4A;

FIG. 5 is a schematic depicting another embodiment of the mannikin detector;

FIG. 6A is a graph of a measured foveal light spectral power distribution for a first color temperature;

FIG. 6B is a graph of a measured retinal-light spectral power distribution for the first color temperature;

FIG. 6C is a graph of a measured foveal spectral power distribution for a second, higher color temperature;

FIG. 6D is a graph of a measured retinal light spectral power distribution for the second color temperature;

FIG. 7 is data score matrix according to one embodiment of the invention; and

FIG. 8 is a flowchart depicting a computerized process for acquiring spectral data according to one embodiment of the invention.

DETAILED DESCRIPTION OF THE INVENTION

This invention relates to systems and methods for performing studies on the effects of light on the health of humans and animals. The invention can be used specifically for studies correlating the impact of light exposure at one or more wavelengths or wavelength ranges known to play a role in influencings a person's physiological responses. The systems and methods of the invention can be conducted in a laboratory, clinical, commercial, and/or industrial setting. The systems and methods of the invention can be used to study the general population or specific sub-populations (e.g., elderly, blind or visually impaired, children, young adults, different ethnic groups, etc.), or universally all populations. Moreover, while described below with respect to a surrogate human subject or cohort, the systems and methods of the invention can be used to study the effects of light on animals and plants.

As used herein, the term foveal spectrum (or foveal spectra) refers to a wavelength-dispersed spectrum (or spectra) of light which entered a pupil and afterwards would have been incident on the foveal cones contributing to a subject's or cohort's foveal vision. As used herein, the term retinal spectrum (or retinal spectra) refers to a wavelength-dispersed spectrum (or spectra) of light which entered a pupil and afterwards would have been incident on the cones, rods and ipRGCs contributing to a subject's or cohort's full range of vision including peripheral vision and foveal vision.

Figure 1A:
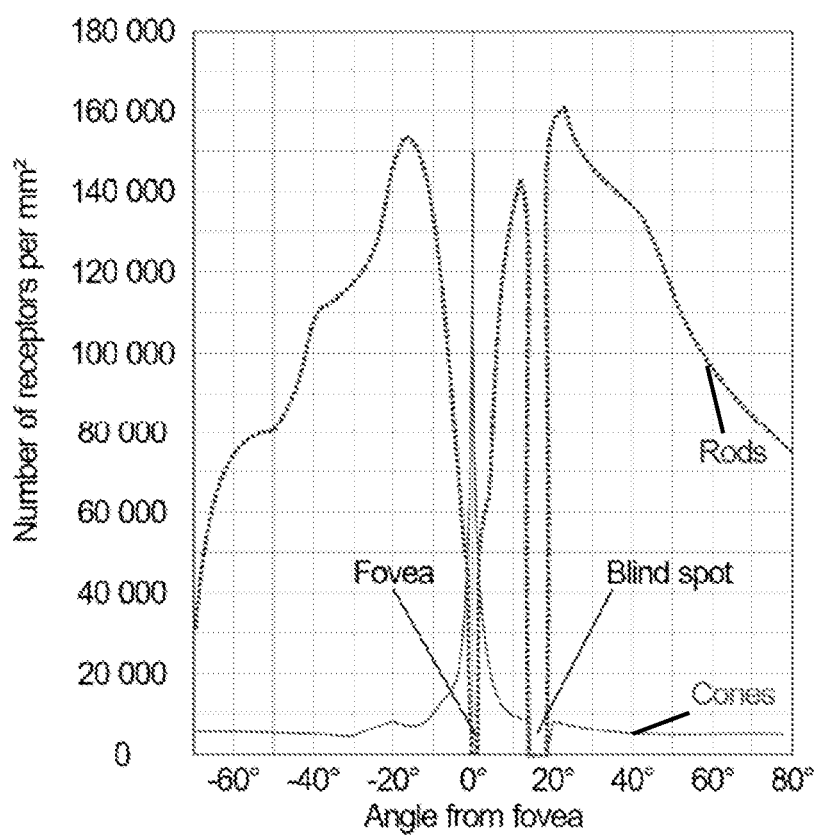
FIG. 1A is a graph of the angular distribution of rods and cones for a human eye.

In one embodiment of the invention, the foveal spectrum may be obtained by optics directing light solely or primarily to one or more positions inside the mannikin opposing a mannikin's pupil where foveal cones would exist in an actual subject, e.g., in an animal or human eye. FIG. 1A is a graph of the angular distribution of rods and cones for a human eye showing the concentration of foveal cones to be located in a narrow solid angle where the retinal cones are concentrated. Accordingly, in one embodiment of the invention, light is collected at from one or more positions inside the narrow solid angle where the retinal cones are concentrated and can then be analyzed by a spectrometer or by a calibrated spectrometer to obtain the foveal spectrum.

In one embodiment of the invention, the retinal spectrum may be obtained by optics that collects incident light over a wide angle and directs the collected light solely or primarily toward a position on a opposite side of a mannikin's pupil where the cones, rods, and ipRGCs would exist in an actual subject, e.g., animal or human eye (see FIG. 1A as an example). Light collected at one or more positions inside the total viewing angle (such as for example within the wide angular distribution shown in FIG. 1A) can then be analyzed by a spectrometer or by a calibrated spectrometer to obtain the retinal spectrum.

inside the solid angle (such as for example within the angular distribution shown in FIG. 1A where the retinal cones are concentrated) can then be analyzed by a spectrometer or by a calibrated spectrometer to obtain the retinal spectrum.

In another embodiment of the invention, the spectrum reaching the rods and ipRGCs may be obtained by measuring a wavelength spectrum of all (or nearly all or a substantial part of) the light entering a mannikin's pupil and subtracting away (or mathematically removing) the foveal spectrum.

As used herein, mannikin or mannikin structure refers to a physical model of the human or animal head including replications of facial features such as eyebrows, eyelashes, cheeks, nose, temple, forehead, eye socket, eyebrow, eyelid, palpebral fissure, chin, and/or lips (see for example FIG. 4B). Details of the replications are provided below, but in general are made to depict the particular cohort being analyzed (e.g., elderly, blind or visually impaired, children, young adults, different ethnic groups, etc.). Accordingly, in various embodiments of the invention, the mannikin comprises a replication of a face. The replication of the face can comprise one or more of an eyebrow structure, an eyelash structure, a cheek structure, a nose structure, a temple structure, a forehead structure, an eye socket structure, eyebrow, eyelid, palpebral fissure, a chin structure, and a lip structure. The replication of the face can comprise a surface finish with a coloration indicative of (or matching that of) skin or fur. In one embodiment, the replication may be a cohort wearing eyeglasses. In one embodiment, the mannikin's outer surfaces are designed to simulate/emulate the absorptive and reflective of properties of a target cohort to be analyzed, where the surface texture, color, make-up, hair, hair color, shape mimic that of the cohort.

Figure 1B:
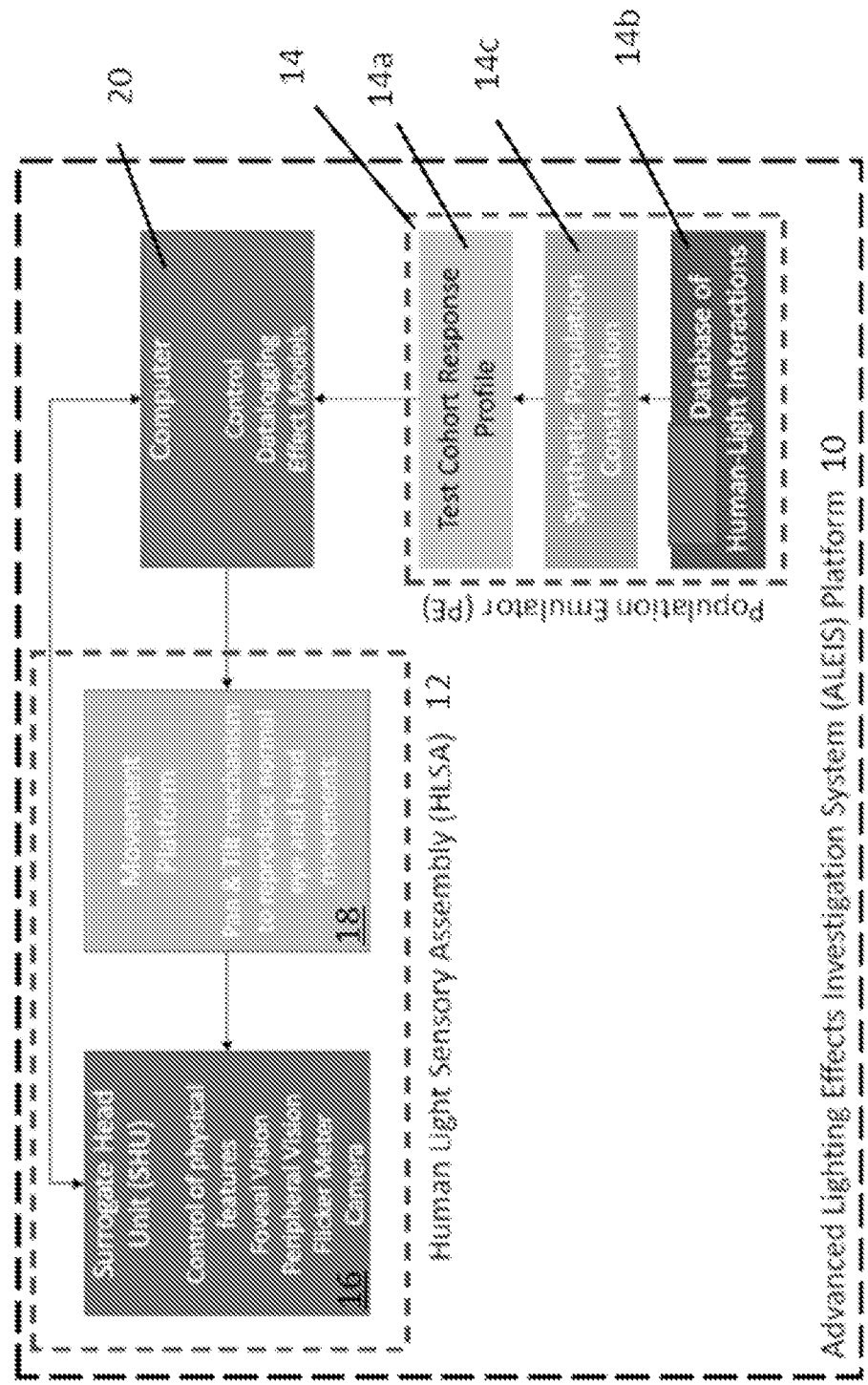
FIG. 1B is a schematic depicting an advanced lighting effects investigation system (ALEIS) instrument of the invention.

FIG. 1B is a functional schematic of an advanced lighting effects investigation system (ALEIS) platform 10 according to one embodiment of the invention. In general, the ALEIS platform 10 includes both hardware and software that can fully characterize light incident on the cornea of a surrogate test subject, including separate determinations of foveal and peripheral vision, and in one embodiment can correlate the measured lighting parameters with expected physiological responses across multiple cohorts. As shown in FIG. 1, the ALEIS platform 10 comprises a human light sensory assembly (HLSA) and a population emulator (PE), shown in FIG. 1B as HLSA 12 and PE 14.

The human light sensory assembly HLSA 12 comprises in one embodiment a surrogate head unit (SHU) assembly 16 mounted on a movement platform 18 (for example the pan-and-tilt stage 38 shown in FIG. 3) to simulate natural head and eye movement. Inside the SHU assembly are two or more fiber optic cables collecting light for transmission to separate, optionally calibrated spectrometers. Optics located at the light-receiving end of the fiber optics allows the HLSA 12 to acquire the light signals associated with foveal and/or peripheral vision, as detailed below. Light admitted into the interior of the SHU 16 (e.g., a mannikin) may be foveal light (i.e., light which is directed at the fovea located within the retina), retinal light (i.e., all light striking the retina), or both.

The ALEIS platform 10 in one embodiment includes a computer system 20 which is programmed for control of the human light sensory assembly HLSA 12 and for control of the population emulator PE 14. The computer system 20 is in general programmed for data collection from the HLSA 12 and data storage in the PE 14 or to a remote site. The computer system 20 includes a main memory such as a random access memory (RAM) or other dynamic storage device (e.g., dynamic RAM (DRAM), static RAM (SRAM), and synchronous DRAM (SDRAM) for storing information and instructions to be executed a processor. Computer system 20 can further include a read only memory (ROM) or other static storage device (e.g., programmable read only memory (PROM), erasable PROM (EPROM), and electrically erasable PROM (EEPROM)) for storing static information and instructions for the processor.

The computer system 20 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). Computer system 20 can perform a portion or all of the processing (or functions) described herein by executing one or more sequences of one or more instructions contained in a memory.

In one embodiment, the population emulator PE 14 comprises test cohort response profile data 14$a$, a database 14$b$ of studies related to human-light interactions, and a synthetic population 14$c$ of a given cohort derived from response models created from data in database 14$b$. The PE 14 can include past and newly generated results for the cohort mannikins representative of a population category. The ALEIIS platform 10 in one embodiment of the invention can provide a correlation relating the spectral and quantitative spectra to studies relating the observed spectra to known physiological effects on a population or sub-population. In addition, in one embodiment, the PE 14 permits a first-pass assessment of the impact of lighting parameters (e.g., illuminance, luminance, SPD, flicker, luminous efficacy, color rendering) on the physiological response of multiple cohorts (e.g., children, youth, young adults, middle age professionals, senior citizens).

The interaction of humans and animals with illumination can be classified into three main effects as perception, acute, and circadian. The visual response is closely associated with the perception of lighting in a space and is impacted by a number of lighting parameters including illuminance, luminance, and color rendering. The non-visual response can be divided into acute effects, which are fast acting (on the order of seconds), and circadian effects, which alter physiology over a longer time-frame. Examples of acute effects include pupil constriction, circulating hormone levels, heart rate, near-term increase in alertness and psychomotor reaction time, and reduced lapses of attention. Circadian light effects are defined as those that cause a sustained change in the phase, period, and/or amplitude of the internal circadian timing system, and examples of circadian effects include the daily timing of physiologic rhythm and sleep cycles. As might be expected, there is some interaction between circadian and acute effects.

Figure 2:
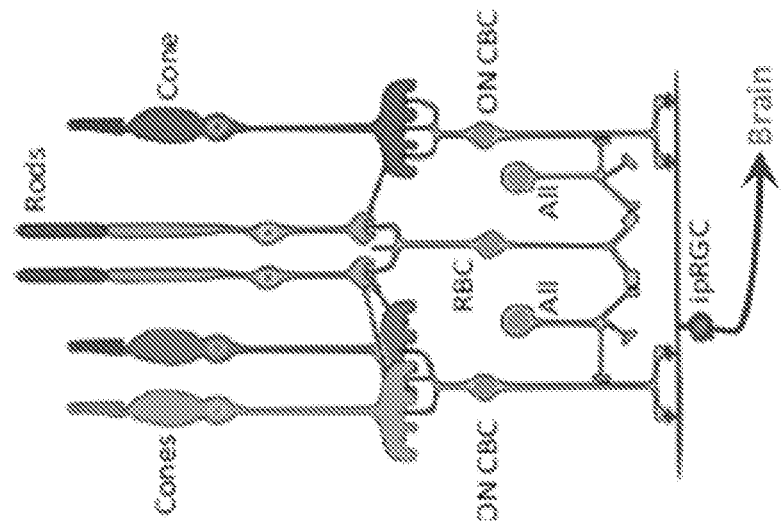
FIG. 2 is a schematic depicting the human eye.
Figure 2:
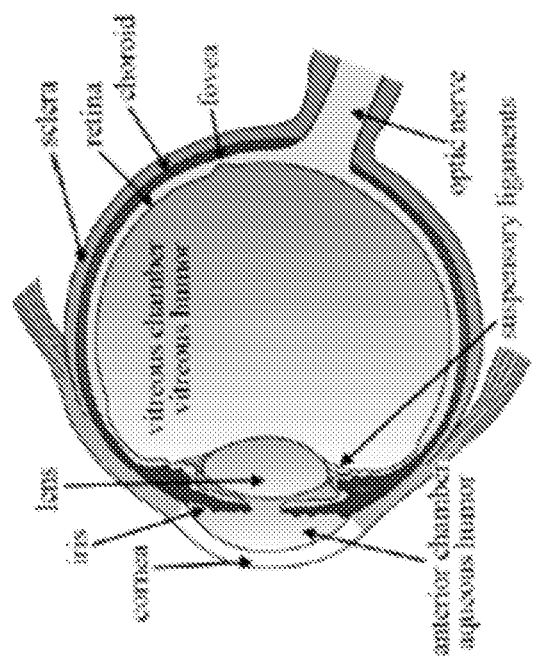

The anatomy of the human eye is shown FIG. 2, along with the retinal circuitry responsible for visual and non-visual responses, and the distribution of photoreceptors in the retina. As shown on right side of FIG. 2, the retinal circuitry in humans includes the photoreceptors (i.e., cones, rod, and ipRGCs) and the interconnect retinal circuitry involving the Cone Bipolar cells (CBC), Rod Bipolar cells (RBC), and Amacrine cells (AII).

As noted earlier, there are five broad classes of photopigments in the human eye—three types of cones (blue, green, and red), the rods, and the ipRGCs. The cones, which are responsible for the perception of color, contain one of three types of photopigments (i.e., opsins)—cyanolabe (blue opsin), chlorolabe (green opsin), and erythrolabe (red opsin). In contrast, the rods contain a single photopigment (rhodopsin) and provide excellent light detection at low luminance or fluence levels, but with no color differentiation. The ipRGCs are involved in non-visual responses to light and contain a single photopigment (melanopsin) that is slower to respond to light, but can signal the presence of light over a long time period, than either cone or rod opsins.

The signals from the cones and rods are primarily associated with the visual response and are directed to the visual cortex in the occipital lobe in the back of the brain. In contrast, the signals from the ipRGCs are sent through the retinohypothalamic tract (RHT) directly to the suprachiasmatic nucleus (SCN) in the hypothalamus (which is part of the limbic system in the brain). As noted earlier, the limbic system is involved in a variety of human functions including emotion, behavior, learning and memory. The limbic system also influences the endocrine system (responsible for hormone production) and the autonomous nervous system (responsible for regulation of automatic body functions such as heart rate, respiration, and pupillary response).

Although the signals for visual and non-visual responses to light are processed in different parts of the brain, the retinal circuitry can result in "cross-talk" between the visual sensors and the ipRGCs through bipolar cells (BC) and amacrine cells (AII). As a result of this "cross-talk," the firing patterns of the ipRGCs are influenced not only by the melanopsin response but also by extrinsic signals from the rods and cones. Consequently, the influence of phototransduction in the vision system (i.e., cones and rods) is an important factor considered when evaluating human "non-visual" responses to light. Analogous photoreceptor systems occur in many animals and their "non-visual" response accounts for the circadian rhythms of animals.

Accordingly, the ALEIS platform 10 of this invention can be used for measuring either or both foveal vision and peripheral vision. In various embodiments of the invention, the ALEIS platform 10 and a corresponding analytical procedure can be used to provide quantitative (and spectral) information on the amount of light entering the eye of a surrogate test subject (i.e., a mannikin) under a given set of lighting conditions. As a particular embodiment, the light entering the eye can be divided into a) that which strikes the cones (i.e., foveal vision) and which is responsible for vision (i.e., foveal vision) and b) that which strikes other parts of the eye (e.g., the rods and the intrinsically photosensitive retinal ganglion cells (ipRGCs)). The foveal cones are responsible for color vision, and the rods and ipRGCs are responsible for other impacts of light including peripheral vision and non-vision effects of light including circadian entrainment and activation of the pupillary light reflex (PLP).

In one embodiment of this invention, the SHU assembly 16 utilizes complimentary optics for each pupil position of a mannikin. In this embodiment, a first optic directs all or almost all, or a majority of the light into a first detector which can wavelength differentiate the light into its frequency or wavelength components and which can optionally quantify the optical flux through a calibration process or other means. The second optic collects that light which would have passed solely or primarily to the fovea. Light from the second optic is directed to a second detector which can wavelength differentiate the light into its frequency or wavelength components and which can optionally quantify the optical flux. For example, in the first and second optics described, the first set can contain spectral (and optionally quantitative) data for only or principally the light which was incident on the entire retina which includes the rods, cones and ipRGCs, and the second set can contain spectral (and optionally quantitative) data for only or principally the light which was incident on the foveal cones Computer 20 collecting the optical data from the complimentary optics for each pupil position of the mannikin can mathematically deduce that light which passed to the peripheral rods and ipRGCs from that light directed to the first optic which contained all or substantially all of the light entering the pupil and that light directed to the second optic which contained light directed only onto the foveal cones. The mathematical calculation permits the two sets of spectral data being collected to resolve one from another. The first and second optics are not limited to resolution between the rods, ipRGCs and cones, but rather adjustments made to the first and second optics (e.g., by changing field of view) can accommodate the resolution of a subset of photoreceptors, and other adjustments to the optics (e.g., lens modification) can help to quantify light dose of individuals with a variety of eye conditions (e.g., glaucoma, cataracts, edema).

Figure 3:
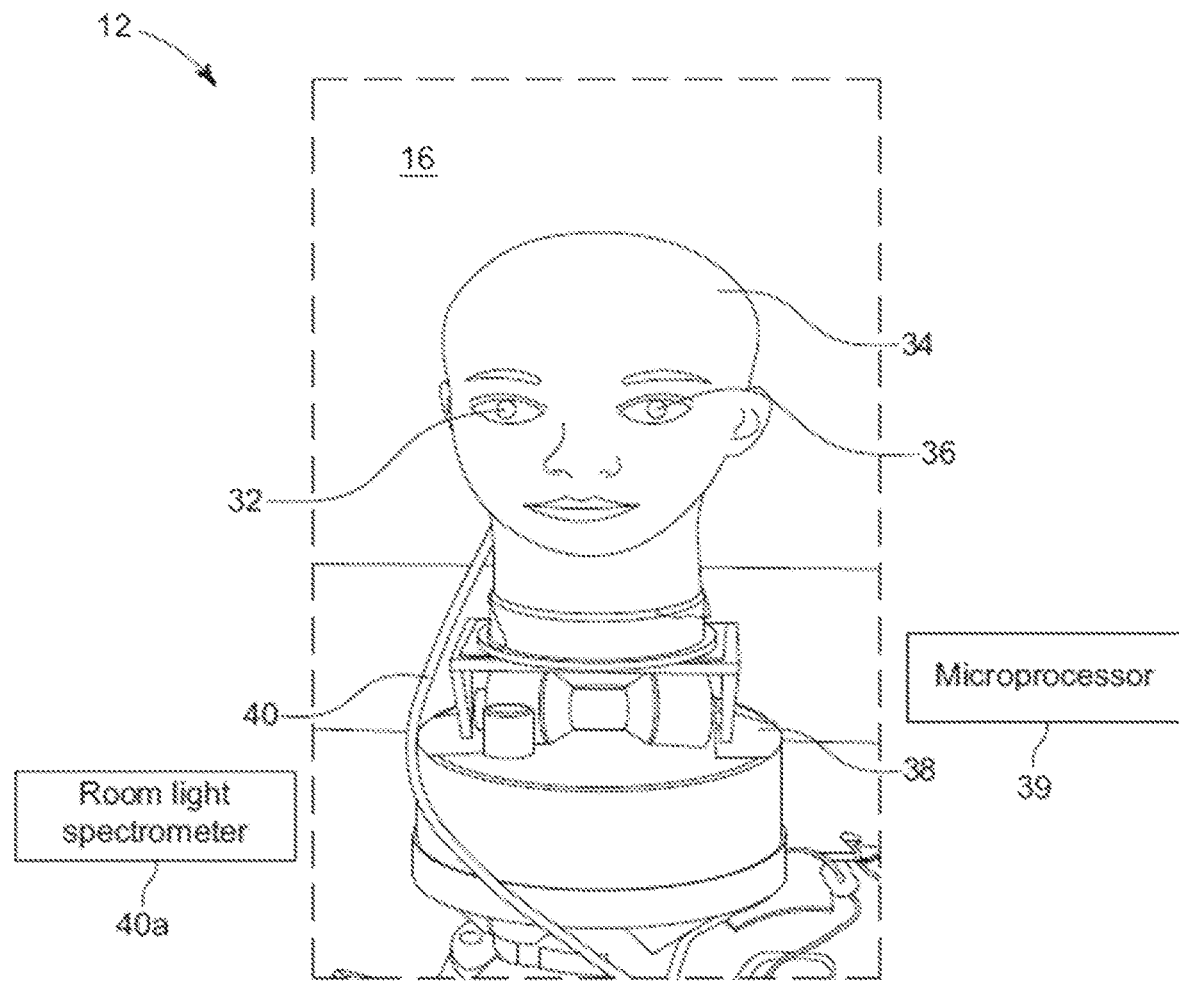
FIG. 3 is a schematic depicting a mannikin detector of the invention.

FIG. 3 is a schematic providing more detail of the surrogate head unit SHU assembly 16 including mannikin structure 34 (i.e., the surrogate of an animal or human head). The use of mannikin structure 34 is significant in the design of this instrument since the presence for example of the cheeks and the eye brow can affect the cut-off angle by which light enters the eye. Likewise, other surrogates can be used for animals to account for the difference in the area around the eye. The advantageous use of mannikin structure 34 permits collection and analysis of light which replicates that of an actual subject without the need for an actual subject.

Mannikins are well known in the art. U.S. Pat. No. 6,923,654 (the entire contents of which are incorporated herein by reference) describes the construction of an artificial eye for a mannikin with the artificial eye having a partially hemispherical shape and providing an eye-mounting area adapted to mate with the artificial eye without risk of subsequent movement of the eye or of distortion of the features surrounding the eye-mounting area of the sculpture. These techniques are suitable for the present invention.

U.S. Pat. No. 4,432,919 (the entire contents of which are incorporated herein by reference) describes a mannikin mold and molding method for making a mannikin which has eyes insert-molded therein in proper position and rotational orientation and which has proper eye-surrounding anatomical surface features. The mold cavity described in the '919 patent has eye socket recesses each of which is surrounded by a correctly contoured surface.

Method for mannikin construction described in the '919 patent and suitable for the present invention include providing in each of two half mold cavity parts a small eye socket recess to snugly receive the front portion of the artificial eye, leaving the rear portion thereof projecting into the mold cavity, and providing in each mold cavity part a correct sculpted or contoured surface of anatomical features immediately around the small eye socket recess right up to the edge thereof, and providing, in that eye socket recess surrounding area, reference indicia marking to facilitate correct rotational positioning of the eye in the eye socket recess for correct directional orientation of the long axis of the elongated pupil of the eye. With eyes inserted into, properly positioned and held in each of the half mold parts, the half parts are then closed together to form the full mold; and the mannikin is then molded by pouring into the mold cavity a liquid polyurethane foaming material, allowing it to foam expand and harden. The material surrounds the rear portion of the eyes and enters the concavities thereof so as to lock the eyes securely in the mannikin. When the two half parts of the mold are separated, the resulting mannikin coming out of the mold has the eyes properly positioned in all respects, rotationally and otherwise, and has correct eye-surrounding anatomical features.

At this point, in the present invention, the interior of the head to the mannikin can be machined out (removed) and the optics described elsewhere in this specification can be inserted.

Commercially available mannikins can be used in the present invention and retrofitted with the optics described elsewhere in this specification can be inserted. These mannikins may be human mannikins or an animal of choice. Mannikins can be purchased from companies such as GenesisDisplay GmbH, Altes Feld 17, 31749 Auetal or from Bernstein Display, 151 West 25th Street, New York, N.Y. 10001 or from Goldsmith Penthouse, 501 Seventh Avenue New York City, N.Y. 10018, USA which offers collections of human mannikins representing different genders, ages, and cultures.

In one embodiment of the invention, as shown in FIG. 3, fiber optic cable 40 would pass through the back of the mannikin structure 34 to a spectrometer which is externally located (not shown). In this embodiment, the collection optics is located entirely inside the manikin such that the only light entering the mannikin is through the locations of mannikin pupils 32 and 36. This arrangement could be used for either the foveal or retinal viewing optical systems. As an example, each fiber optic cable could be directly connected to a spectrometer such as a USB 2000 spectrometer from Ocean Optics. This spectrometer (or a similar one) could include a wavelength dispersive component such as a grating or prism, and can perform radiometric measurements using a calibrated spectrometer, for example calibrated to NIST-traceable standards (or other standards). Available NIST calibrations are described at www.nist.gov/calibrations/photometric-measurements-calilbrations. The spectrometers could be connected to a computer for example through a USB cable.

As shown in FIG. 3, a room-light reference spectrometer 40a can collect light from the room directly without the room light passing though or into a mannikin structure. This spectrometer, which is termed herein a "proximity spectrometer," can be pointed either toward the light(s) or toward the floor, depending upon the type of measurement to be made. In one embodiment of the invention, population emulator PE 14 can store therein a comparison of the light directly collected from the room by the proximity spectrometer 40a to light collected from the mannikin structure 34. A correlation matrix for each cohort can be derived and stored. The correlation matrix would then permit the light measured in a room to be converted into its foveal spectrum and retinal spectrum for each cohort or subject where there exists in PE 14 (or elsewhere) a predetermined correlation matrix. Thus, in one embodiment of the invention, a room-light reference spectrometer coupled to the software of the PE 14 can provide an accurate representation of the foveal spectrum and retinal spectrum for each cohort, without the need to have an actual patient or a mannikin structure to be at the test site.

As shown in FIG. 3, the HLSA 12 includes a pan-and-tilt stage 38 holding the SHU 16. One suitable pan-and-tilt stage 38 is the Newark heavy duty pan/tilt mount, part number 82-12440. A programable microprocessor 39 can control the power to each movement channel. More specifically, the programable microprocessor 39 and the pan-and-tilt stage 38 facilitate movement of the mannikin head 34. In one embodiment of the invention, movement of the mannikin head 34 can be programmed according to any specified protocol such as tracking the head movements of a typical office worker or a student. The motions are not only adjustable for different individual motions, but also can be programable to repeat continuously at a desired time sequence. Incorporating mannikin structure 34 on a computer-controlled pan-and-tilt base 39 permits HLSA 12 to make lighting exposure measurements according to the normal head and eye movement patterns of a potential test subject.

As an example of a typical program to simulate the behavior of an office worker, the pan-and-tilt stage 38 can be set up to look at a computer monitor for 60 seconds, then look at a keyboard for 10 seconds, and then look at a sheet of white paper for 20 seconds. The lighting spectrum at the eye will change significantly during this program with light emissions from the computer monitor, light reflection from the keyboards, and light reflection from the paper all impacting the total light dose.

Experiments by the inventors (described in more detail below with regard to FIG. 6) have shown that the resultant effect of the movement is different for foveal and peripheral vision, with the latter affected more by background light (and more susceptible to the effects of lighting in the room including the spectral tuning of the light source, e.g., the color rendering of the light source). Experiments by the inventors have shown that both foveal and peripheral vision are affected by reflected light from the mannikin facial features with the reflected light being dependent on the spectral tuning. Since both affect the firing of the ipRGCs through crosstalk of the photoreceptors, an advantageous feature of this invention is that HLSA 12 can capture both foveal and peripheral vision in order for investigators to understand better the physiological effects of light on actual persons in their environment or in order for inspectors to measure accurately the long-term expected exposures and its effect on the actual persons in their environment.

In one embodiment of the invention, a photometric flicker detector is added to permit study of the effect of flicker on a cohort. As an example, a spectrometer such as the room light spectrometer 40a, shown in FIG. 3, can be used for real-time flicker detection and flicker waveform measurements. In order to use the spectrometer in this way, the sampling rate for data acquisition must be higher than the expected maximum flicker frequency. Then, calculating the measured illuminance with time provides the flicker waveform which can be used to calculate flicker properties such as % Flicker and Flicker Index. Alternatively, a high-speed photo-detector can be added for measuring photometric light flicker up to the maximum sampling rate of the photodetector (typically less than 3,000 hertz (Hz)).

In one embodiment of the invention, occasionally (e.g. on a predetermined schedule), the pan-and-tilt base can be set to view the ceiling, so that spectrometers in the mannikin structure 34 can directly measure light emissions from the luminaires (including the flicker). In this embodiment, the recorded spectra under this condition of directly measuring light emissions from the luminaires serves as a proximity spectrum, similar to that taken with proximity spectrometer 40a.

In another embodiment of the invention, one or both spectrometers (and associated optics) would be incorporated into the mannikin 34 of the surrogate head. As shown in FIG. 4A, the cavity 42 of the mannikin 34 can be filled with an attenuating material 44, such as a material that simulates the optical properties of the vitreous humor in the eye, a material that simulates an eye disease such as cataracts, etc., and/or a material that has an index of refraction similar to that of key structures in the eye (e.g., the cornea). Light entering the pupil would propagate through the attenuating materials 44 and thereafter be collected by spectrometer 46.

In FIG. 4A, the mannikin 34 is schematically represented by a broken rectangle. This shape is not meant to be representative of an actual mannikin, but merely represents a schematic block containing therein the elements depicted in FIG. 4A. FIG. 4B is a depiction of front and side views of an actual mannikin that would be used in this invention.

In one embodiment of HLSA 12, a first spectrometer 46a (shown in FIG. 5) is placed inside the mannikin structure 42 and collects via fiber optic 48a light from the approximate location of pupil 32 of one iris in the mannikin 34. Here again, the mannikin 34 shown in FIG. 5 is schematically represented by a broken rectangle. This shape is not meant to be representative of an actual mannikin, but merely represents a schematic block containing therein the elements depicted in FIG. 5. In this first optical system embodiment of the invention, the optics on the light-receiving end of the fiber optic 48a is designed to approximate a 10° viewing angle for foveal vision. Spectrometer 46a can be a calibrated spectrometer. The optical system in this configuration acting as a foveal vision detector can be selected by choice of the diameter of the fiber optic, the acceptance angle of the fiber optic, and/or through the use of any lenses or apertures placed in front of the fiber optic.

In one embodiment of HLSA 12, a second spectrometer 46b (shown in FIG. 5) is placed inside the mannikin structure 42 and collects via fiber optics 46b light from the approximate location of pupil 36 of the other iris in the mannikin 34. In this second optical system embodiment, the optics on the light-receiving end of the fiber optic 48b is designed to collect light from a wide viewing angle approximating human peripheral vision. Spectrometer 46b can be a calibrated spectrometer. Several approaches can be used to approximate human peripheral vision including the use of a wide-angle lens or a lens with high diffuse transmittance at the entrance of fiber optic 48b.

In one embodiment of the invention, the spectrometers used in HLSA 12 can include a fiber optic input (as shown in FIGS. 4A and 4B) combined with a dispersion grating and a silicon charge-coupled device (CCD) array detector. In another embodiment of the invention, data transfer and unit control functions are achieved through wireless communications between computer 20 or microprocessor 39 and the HLSA 12.

Accordingly, in one embodiment of the invention, fiber optic cables connected to spectrometers are placed in the approximate location of each cornea in a surrogate of the human or animal head. Interchangeable surrogate heads can be used to accommodate the impacts of facial features (e.g., nose, brows, cheeks) on light reaching the cornea. The optical system on the light-receiving end of the fiber optic cable (connected to a calibrated spectrometer) can be designed for example to approximate a 10-degree viewing angle for foveal vision. The first optical system on this foveal vision detector is selected by the choice of fiber optic diameter, the acceptance angle of the fiber optic cable, and any other lenses or apertures placed in front of the fiber optic cable. The second optical system on the second calibrated spectrometer is designed to emulate a wide viewing angle, approximating peripheral vision. This capability can be set by the choice of fiber optic acceptance angle, fiber optic diameter, and the properties of any optic placed at the light-receiving end of the fiber optic cable. In some embodiments, to approximate wide-angle human or animal vision, depending on the intent, a wide-angle lens or a lens with high diffuse transmittance is used.

In one embodiment of the invention, only the fiber optic cable and associated external optics are incorporated into the mannikin. The cable would then pass through the back of the mannikin head to the spectrometer, which is externally located.

In one embodiment of the invention, both first and second spectrometers (and associated optics) are incorporated into the mannikin head.

As described above, with reference to FIG. 3, the pan-and-tilt stage 38 can simulate natural head and eye movement. The pan-and-tilt stage for example can rotate 360 degrees in all directions at speeds of 0.5 degrees per second up to 360 degrees per second. Different SHUs (e.g., for children, young adults, older adults, animals) can be connected to the pan-and-tilt stage to study these cohorts. As an example of a typical program to simulate the behavior at an office, the pan-and-tilt stage can be set up to look at a computer monitor for a set time period, then look at a keyboard, and then look at a wall of the room. ALEIS platform 10 can be programmed to periodically view the luminaires to obtain direct measurements of spectral power distributions (SPDs).

FIGS. 6A-6D show graphical plots of measured spectral power distributions obtained with ALEIS platform 10 in a room with tunable white lighting (TWL) fixtures set to 2,700 Kelvin (K) and 6,500 K. FIG. 6A is the foveal SPD for 2,700 Kelvin (K). FIG. 6B is the retinal SPD for 2,700 Kelvin (K). FIG. 6C is the foveal SPD for 6,500 Kelvin (K). FIG. 6D is the retinal SPD for 6.500 Kelvin (K).

In the working examples shown in FIG. 6, the spectral light measurements were taken when the gaze alternated from a computer monitor, to a white wall, to a wooden table. In this working example, the monitor and the table were approximately 6 feet (ft) from the ALEIS detector. The wall was approximately 14 ft away. For the foveal vision scans, the light emissions from the fluorescent backlight in the computer monitor were readily apparent. The only difference between the foveal vision monitor SPDs acquired at 2,700 K and 6,500 K was the light reflection of the TWL fixtures from the screen (as indicated by the change in the 455 nanometer [nm] peak). The SPDs measured by ALEIS for foveal vision of the wall and the table reflected the intrinsic properties of the light produced from the luminaire as modified by the absorbance and reflectance of the target (high absorbance for the wood table and low absorbance for the white wall). Consequently, there was a distinct difference in the foveal vision spectra, separate from the TWL setting, depending on the object being viewed, which resulted in different photon distributions passing through the cornea to the retinal.

FIGS. 6A-6D also show the SPDs for foveal vision and peripheral vision when focused on a computer monitor (yellow), white wall (gray), and a wood table (blue).

Note that the spectra obtained from peripheral vision detector is mainly reflected light and is impacted by the reflectance (or absorbance) of the objects in the field of view. This working example demonstrates that the retinal SPDs will exhibit changes in light flux levels (tied to absorbance/reflectance and distance from the target) and spectral changes between objects when the correlated color temperature (CCT) of the illumination is changed.

This working example demonstrates that analysis of the lighting spectrum at the eye of a subject in a realistic environment will change significantly depending upon the direction of gaze. Because both foveal and peripheral vision affect the firing of the ipRGCs, it is important, in one embodiment of the invention, to accurately measure both in order to corelate the environmental light conditions to the foveal and peripheral SPDS to the physiological effects of light.

As an example of the ALEIS platform's utility, boys afflicted with attention deficit hyperactivity disorder (ADHD) were found to move their heads 2.3 times more than children in a control group. Their head movements covered an area 3.8 times larger than the control group. Consequently, the light "dose" for a child diagnosed with ADHD is likely significantly different than that of an unafflicted child, increasing the difficulty of conducting human trials about the effects of lighting on school children. To overcome this problem, without the present invention, extensive human trials would be necessary to determine the proper lighting recipe (i.e., both SPD and illuminance levels) in order to obtain the best results for a cohort of school children with a sub-population of ADHD students. However, the ALEIS platform of this invention described above can be used to confirm or deny specific hypotheses (e.g., the effects of head movement or local surfaces and finishes) beforehand, thereby allowing the human trials to more precisely on the critical factors impacting the human eyes of these ADHD students.

Another significant component of the ALEIS platform is the population emulator PE 14 noted above which correlates the lighting response measured with the HLSA 12 with the physiological response that is expected for a chosen cohort. In the PE 14 is a database of data relevant to the physiological effects of lighting. Data in the database can be drawn from the technical and public literature. This data is retrieved, archived into the database, and assigned a data quality index (DQI). A list of these parameters and examples of measurement conditions that would result in higher and lower DQI scores is provided in the table contained in FIG. 7. The present invention is not limited to the values of the scores, but rather would use the scores as a relative comparison factor. The measurement conditions shown in the second and third columns of the table represent conditions under which the foveal and retinal spectra noted above can be obtained. In one embodiment of the invention, the data would be analyzed to create a model of the response for a chosen cohort. Examples of cohorts can include young children, young adults (ages 20-25), or senior citizens (age 60 years and older).

In cases where data with high DQIs exist for a cohort, it is likely that the average response of the cohort can be modeled along with a deviation from the average. In one embodiment, this information is used to create the synthetic population 14c for each selected cohort. In addition to lighting studies, the database 14b can include studies on relevant covariates and behavior such as head movement, pupil response, eye color, and other factors which may impact the light at the eye. When possible, the magnitude of these covariates can be classified by cohort. When that is not possible, average models for all populations can be determined and used.

Using the information in the database 14b, in one embodiment of the invention, models can be created for the physiological response of a chosen cohort to light. These models can be weighted by the DQI with results from studies with higher DQI being more deterministic to the outcome predicted by the model. Relevant data can be used to calculate the average and the standard deviation. The average and standard deviation can be formulated into a synthetic population using Monte Carlo simulations. Synthetic populations which are simplified microscopic representations of the actual population. The populations are simplified because not all attributes are included. For example, attributes such as height and weight may be ignored in construction the synthetic population unless inclusion of these variables is supported by the literature. The synthetic population is microscopic because every person in the cohort can be represented individually.

Operation of the HLSA

One procedure for configuring the HLSA platform 12 to take analytical measurements of the number of photons. sorted by wavelength striking the retinal, includes the following procedures.

1) Calibrate each spectrometer (i.e., the spectrometers mounted relative to the mannikin head and any proximity spectrometer(s) throughout the area to be measured) using a NIST-traceable radiometric calibration source.

2) Set the field-of-view of the fiber optic cable and make any other external optical adjustments to the fiber at the desired settings. The field-of-view may be the same or different in each pupil. These adjustments are made in the following manner:

a. The field of view for foveal vision can be set for example to 10° either by choice of the fiber optic cable (i.e., fiber diameter) or by placing a lens in front of the fiber;

b. The field of view for peripheral vision (or retinal light) can be set to any value between 0° and 180° by choice of optic in front of the fiber. A 180° field-of-view is achieved by placing a cosine corrector (i.e., a lens with Lambertian transmittance) in front of the lens. Smaller fields-of-view can be achieved using one or more appropriate lenses. In addition, transmissive optical diffuser films, such as those available from BrightView and Luminit, can be used to provide a field of view between 60° and 180°.

c. External optical adjustments can be made to the signal entering the fiber optic cable by adding an optical cavity in front of the fiber, an aperture, or other optical element In one embodiment of the invention, the pan-and-tilt platform 38 holding the mannikin head 34 is adjusted so that the "gaze" of the mannikin is pointed in a desired direction such as a computer screen, keyboard, spot on the wall, ceiling, person, etc.

In one embodiment of the invention, one or more calibrated spectrometers are set to the desired field-of-view, and a wavelength-resolved spectrum is acquired for each direction of gaze by the mannikin.

In one embodiment of the invention, the spectrum-acquiring process can be repeated for all likely gaze directions to create a viewing profile.

In one embodiment of the invention, the spectrum-acquiring process can be repeated for all locations in a room or area of interest to study the variation in lighting across the structure.

The method of acquiring data includes the following steps depicted in FIG. 8.

At step 402, calibrated spectral data of light having entered the mannikin structure 34 (using for example the procedures noted above) is acquired. At step 404, the calibrated spectral data is curve fitted from which the number of photons of a selected wavelength range (i.e., band) are determined. In one embodiment of the invention, a "photon dose" for each wavelength band of interest can be determined from the SPD.

At step 406, simultaneously or in sequence, acquire spectral data of light in proximity to the mannikin (e.g. light from an environment outside the mannikin) which can be taken at a separate location distinct from the mannikin head using the calibrated proximity spectrometer 40a either pointed toward the ceiling or toward the floor. The proximity spectrometer 40*a* could be mounted at or near the ceiling to measure light reflected from the floor or could be placed on a desktop to measure light produced by any overhead illumination.

At step 408, a correlation matrix is developed between spectral readings from the spectrometer(s) 46, 46*a*, 46*b* in the mannikin structure 34 (first spectral data) to the proximity spectra (second spectral data) optionally for each direction of gaze for the mannikin 34. In one embodiment of the invention, the correlation matrix permits the proximity spectrometer(s) to be used in studies with subjects as a proxy for mannikin readings.

At step 410, a photon dose for specific wavelength rages is determined. The photon dose can be determined by one of the following procedures, and this information can be used to study physiological changes:

a) Curve fitting of a calibrated spectrum from a spectrometer mounted in a mannikin head. The spectrometer is configured with a pre-selected field-of-view and optional substances (e.g., vitreous humor or cataract simulator) to simulate the effects of changes in the eye such as those that can occur during aging.

b) Take measurements with calibrated proximity spectrometer and utilize the correlation matrix to develop a model for light exposure at the eye, the retina, or some other response to light.

Other Applications

Besides utilization of the ALEIS platform 10 of this invention for evaluation of the effects of the lighting environment on a subject or a population or a sub-population class, as detailed above, ALEIS platform 10 of this invention can be used for other applications.

The effects of UV radiation on the human eye has been known for some time. A variety of sunglasses and other face shields have been designed to block principally normally incident light from entering the eve through the use of UV-blocking materials. Besides sunglasses to block UV light from the sun, welding glasses and goggles are used to block artificial sources of UV light from entering the eye. However, these devices often do not completely mold to the human's face wearing these protective devices. This raises the possibility of UV light scatter and by-pass of the protective devices. Such a by-pass would be more likely when the person wearing the protective device was moving their head in a variety of different directions. Outdoorsmen and sportsmen would for example be expected to gaze from upward and downward and from side to side, changing the angles by which light could reflect into the human eye including that of reflecting from interior surfaces of sunglasses into the human eye.

The ALEIS platform 10 of this invention could be used to observe and/or quantify the UV wavelength exposure for both foveal and retinal spectra.

Moreover, many people choose not to wear protective devices outside. The effects of skin color, makeup, hair color, and clothing on UV exposure could be analyzed to see if populations or sub-population were more suspect than others to UV exposure.

In another application for the ALEIS platform 10 of this invention, the effects of light from computer monitors, laptops, mobile devices, gaming devices, virtual reality devices on the physiology of populations or sub-population could be analyzed.

In another application for the ALEIS platform 10 of this invention, the effects of light on animals can be analyzed by using a proper surrogate. Light is known to have both beneficial (e.g., reduce aggression in chicken) and detrimental (e.g., attract animals to unsafe areas) effects depending upon the frequency and timing.

Numerous modifications and variations of the invention are possible in light of the above teachings. It is therefore to be understood that within the scope of the appended claims, the invention may be practiced otherwise than as specifically described herein.

The invention claimed is:

1. A mannikin-based optical analyzer for analyzing an exposure of a subject of a population or a sub-population to an environmental lighting condition, comprising:
   a mannikin
   at least one pupil disposed in an eye socket of the mannikin for admission of light into the mannikin;
   the mannikin comprising a) an outer laterally-extending surface replicating a face and a facial profile of a surrogate head of the subject of the population or the sub-population being analyzed, and b) an interior inside the outer laterally-extending surface; and
   at least one optical detector configured to acquire and wavelength analyze light directed through the at least one pupil,
   wherein the at least one optical detector comprises
      a first optical detector configured to a) collect foveal light directed to a first position opposing the at least one pupil and b) wavelength analyze the foveal light into a foveal-light spectrum, and
      a second optical detector configured to a) collect retinal light angularly directed from the at least one pupil directly to a second position angularly offset from the first position and b) wavelength analyze the retinal light into a retinal-light spectrum.

2. The analyzer of claim 1, further comprising
   a processor programmed to a) store the foveal-light spectrum and the retinal-light spectrum and b) correlate the foveal-light spectrum and the retinal-light spectrum with the subject exposed to the environmental lighting condition.

3. The analyzer of claim 1, wherein the first optical detector and the second optical detector are disposed inside the mannikin.

4. The analyzer of claim 1, wherein the first optical detector, the second optical detector, and the processor are disposed inside the mannikin.

5. The analyzer of claim 1, wherein the first optical detector and the second optical detector are disposed inside the mannikin, and the first optical detector and the second optical detector communicate wirelessly to the processor.

6. The analyzer of claim 1, wherein the first optical detector comprises a fiber optic disposed with an entrance thereof at the at least one pupil for transmission of the foveal light to a wavelength dispersion element.

7. The analyzer of claim 6, wherein the first optical detector comprises a calibrated optical detector for quantification of photon flux in the foveal-light spectrum.

8. The analyzer of claim 1, wherein the second optical detector comprises a fiber optic disposed with an entrance thereof at the at least one pupil for transmission of the retinal light to a wavelength dispersion element.

9. The analyzer of claim 8, wherein the second optical detector comprises a calibrated optical detector for quantification of photon flux in the retinal-light spectrum.

10. The analyzer of claim 1, wherein the processor obtains a proximity spectrum of the environmental lighting condition from at least one of the first and second optical detectors, and correlates the proximity spectrum with at least one of the foveal-light spectrum and the retinal-light spectrum.

11. The analyzer of claim 1, further comprising a proximity detector disposed outside the mannikin,
wherein the processor obtains a proximity spectrum of the environmental lighting condition from the proximity detector and correlates the proximity spectrum with at least one of the foveal-light spectrum and the retinal-light spectrum.

12. The analyzer of claim 1, wherein the processor correlates, for the environmental lighting condition, the foveal-light spectrum and the retinal-light spectrum with the population-specific replica exposed to the environmental lighting condition.

13. The analyzer of claim 1, further comprising a moveable stage holding the mannikin.

14. The analyzer of claim 13, wherein the moveable stage is moveable in directions which simulate movements of the subject under the environmental lighting condition.

15. The analyzer of claim 1, wherein the mannikin comprises a population-specific replica of one of an elderly person, a child, a teenager, an adult man, an adult woman, a blind or visually impaired person, and one of a plurality of persons of different ethnic groups.

16. The analyzer of claim 1, wherein the mannikin comprises a replication of a human face.

17. The analyzer of claim 16, wherein the replication of the human face comprises one or more of an eyebrow structure, an eyelash structure, a cheek structure, a nose structure, a temple structure, a forehead structure, an eye socket structure, a chin structure, and a lip structure.

18. The analyzer of claim 16, wherein the replication of the human face comprises a surface finish with a coloration indicative of human skin.

19. The analyzer of claim 16, wherein the replication comprises eyeglasses disposed thereon.

20. The analyzer of claim 1, wherein the interior of the mannikin comprises a section of an attenuating material through which the light passes before arriving at at least one of the first optical detector and the second optical detector.

21. The analyzer of claim 1, wherein, with the mannikin comprising the outer laterally-extending surface, the interior inside the laterally-extending outer surface, and the at least one pupil for admission of light into the interior of the mannikin, the interior of the mannikin separate from the at least one pupil comprises a section of a material simulating a part of an eye through which the light passes before arriving at at least one of the first optical detector and the second optical detector.

22. A lighting effect analysis system comprising
the mannikin-based optical analyzer of claim 1; and
a population emulator for a) storage of data collected from the mannikin-based optical analyzer and b) correlation of the data collected to ambient light conditions for respective subjects.

23. An ambient light sensor, comprising:
at least one pupil disposed in an eye socket of the mannikin for admission of light into the mannikin, the mannikin comprising a) an outer laterally-extending surface replicating a face and a facial profile of a surrogate head of a subject of a population or a subpopulation being analyzed, and b) an interior inside the outer laterally-extending surface,
an optical detector collecting ambient light and configured to wavelength analyze the ambient light into an ambient-light spectrum, the optical detector comprising a first optical detector configured to a) collect foveal light directed to a first position opposing the at least one pupil and b) wavelength analyze the foveal light into foveal-light spectra from a plurality of subjects, and a second optical detector configured to a) collect retinal light angularly directed from the at least one pupil directly to a second position angularly offset from the first position and b) wavelength analyze the retinal light into retinal-light spectra from the plurality of subjects;
a processor storing the foveal-light spectra and the retinal-light spectra from the plurality of subjects under different environmental lighting conditions as pre-recorded foveal-light spectra and retinal-light spectra; and
the processor programmed to select one of the pre-recorded foveal-light spectra and retinal-light spectra based on a) an identification of a specific lighting condition, b) a specific subject being exposed to the ambient light, and c) the ambient spectrum.

* * * * *